United States Patent [19]

Yew

[11] Patent Number: 4,593,798
[45] Date of Patent: Jun. 10, 1986

[54] IDLE RESTART CLUTCHING SYSTEM

[75] Inventor: Kwang Yew, Chatham, Canada

[73] Assignee: Canadian Fram Limited, Chatham, Canada

[21] Appl. No.: 490,710

[22] Filed: May 2, 1983

[51] Int. Cl.[4] .......................... B60K 9/04; B60K 41/02; F16D 27/02; F16D 47/00

[52] U.S. Cl. ..................... 192/0.033; 74/572; 123/179 J; 180/165; 192/0.076; 192/0.098; 192/48.2; 192/48.3; 192/80; 192/84 T; 192/104 C

[58] Field of Search ............... 192/0.033, 0.076, 0.077, 192/0.084, 0.098, 48.2, 48.3, 80, 81 R, 81 C, 52, 84 T, 104 C, 107 T; 123/179 J; 180/165; 74/7 C, 572

[56] References Cited

U.S. PATENT DOCUMENTS

| | | | |
|---|---|---|---|
| 1,936,029 | 11/1933 | Ruesemberg | 192/52 X |
| 2,001,931 | 5/1935 | Lyman | 192/48.3 X |
| 2,384,110 | 9/1945 | Malmquist | 74/572 X |
| 2,663,397 | 12/1953 | Scott | 192/48.3 X |
| 2,694,937 | 11/1954 | Birbaum | 192/48.3 X |
| 3,095,071 | 6/1963 | Mason | 192/82 T X |
| 3,315,773 | 4/1967 | Aschauer | 192/48.2 |
| 3,387,683 | 6/1968 | Budzich | 180/165 |
| 3,734,222 | 5/1973 | Bardwick, III | 180/165 |
| 3,882,950 | 5/1975 | Strohlein | 123/179 J X |
| 3,886,810 | 6/1975 | Sugiyama et al. | 74/572 X |
| 4,252,208 | 2/1981 | Heidemeyer et al. | 180/165 |
| 4,271,948 | 6/1981 | Yew | 192/84 T |
| 4,282,947 | 8/1981 | Kemper | 74/572 X |
| 4,329,889 | 5/1982 | Hachiya | 180/165 X |
| 4,346,773 | 8/1982 | Hofbauer et al. | 180/165 |
| 4,372,262 | 2/1983 | Kaniut | 74/7 C |
| 4,405,031 | 9/1983 | Rotter | 180/165 |
| 4,407,393 | 10/1983 | Fiala | 180/165 X |
| 4,412,460 | 11/1983 | Barthelemy | 192/104 C X |
| 4,416,360 | 4/1983 | Fiala | 74/572 X |
| 4,445,601 | 5/1984 | Hofbauer et al. | 192/48.3 |
| 4,458,154 | 7/1984 | Maucher et al. | 180/165 X |

FOREIGN PATENT DOCUMENTS

| | | | |
|---|---|---|---|
| 1296985 | 6/1969 | Fed. Rep. of Germany | 192/48.2 |
| 2217785 | 10/1973 | Fed. Rep. of Germany | 192/48.3 |
| 1073574 | 9/1954 | France | 192/48.3 |
| 0421254 | 9/1933 | United Kingdom | 192/52 |
| 2031822 | 4/1980 | United Kingdom | 180/165 |

Primary Examiner—Rodney H. Bonck
Attorney, Agent, or Firm—Markell Seitzman; Russel C. Wells

[57] ABSTRACT

An idle restart clutch system adopted to mechanically engage the crankshaft of an engine for use in restarting same comprising a spool body adapted to engage the crankshaft for rotating therewith; a momentum wheel mounted relative to the crankshaft for storing rotational energy; a drive for transferring rotational energy from the spool body to the momentum wheel during interval as determined by the rotational speed differential therebetween; and a torque limiting clutch mounted to and rotatable with the momentum wheel for controlling slippage motion between the momentum wheel and engine in response to control signals to enable the energy of the momentum wheel to be transferred to the spool body and thereafter to the crankshaft of the engine to enable rotation of same.

8 Claims, 3 Drawing Figures

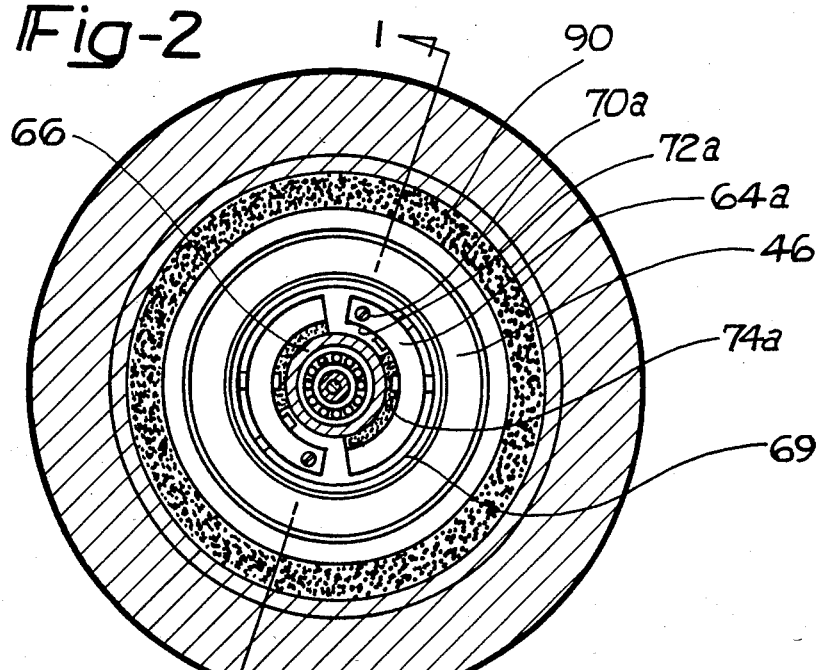
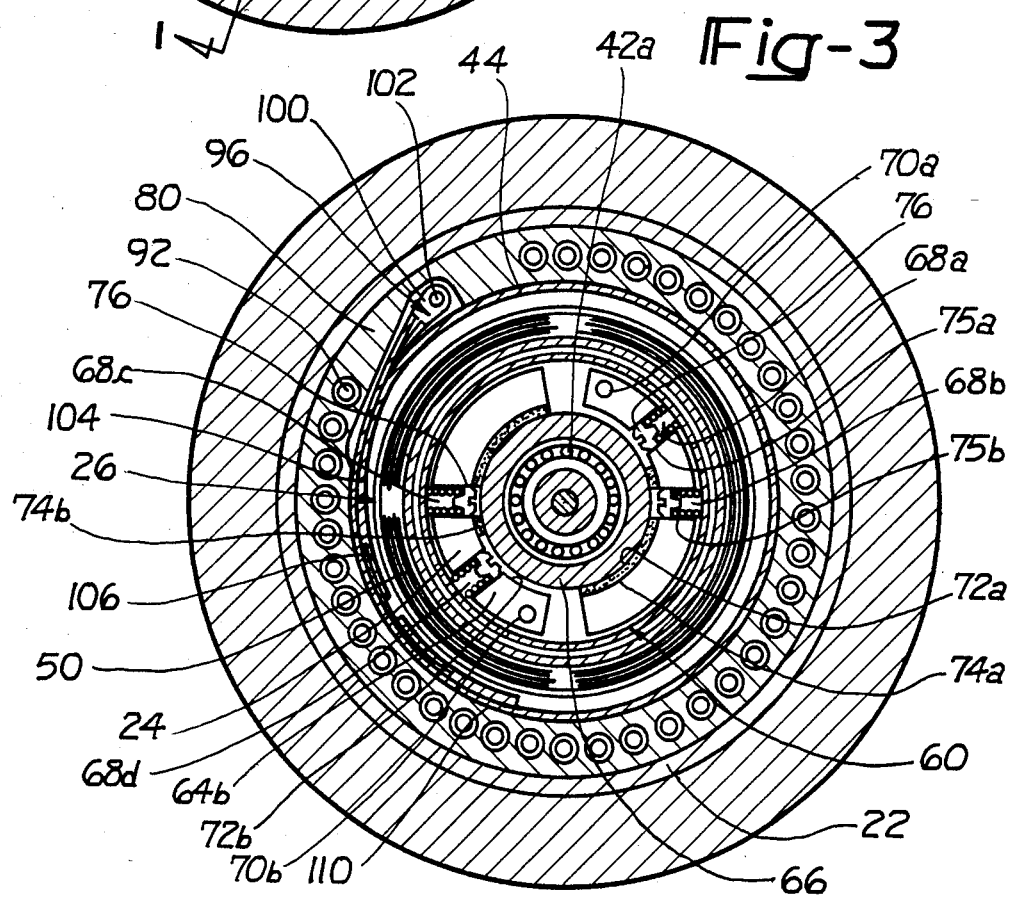

IDLE RESTART CLUTCHING SYSTEM

BACKGROUND AND SUMMARY OF THE INVENTION

This application relates to an apparatus for restarting an engine and more particularly to methods of transferring angular momentum between the engine and apparatus. The present invention has as an object of reducing fuel consumption for automotive vehicles. It can be demonstrated that if an automotive engine is automatically turned off during periods when the vehicle is stationary, in an idling condition or during periods of deacceleration, fuel consumption will be reduced. The invention, as described in detail below, is widely applicable to automotive vehicle operation in dense city traffic during which operation of the vehicle is continually maintained at idle. Once an engine has been turned off it can be restarted in a conventional manner using the starter motor. A deficiency in using the starter motor is excessive noise, accelerated wear and a reduction of the reliability of the starter motor-engine combination. The present invention utilizes a momentum wheel or flywheel that is directly connected to the engine crankshaft which results in a superior method and apparatus for automatically restarting a stalled or shutdown engine. The utilization of a direct connection to the engine's crankshaft eliminates the need for external belts, gears, and chains to power the momentum wheel. However, such an indirect connection is within the purview of the present invention. Accordingly, the present invention comprises:

An idle restart clutch adapted to mechanically engage the crankshaft of an engine for use in restarting the same comprising:

spool body means adapted to engage the crankshaft for rotating therewith;

momentum wheel means mounted relative to the crankshaft for storing rotational energy;

driving means mounted between said spool body means and the momentum wheel means for transferring the rotational energy from said spool body means to the momentum wheel means during intervals as determined by the rotational speed differential therebetween;

torque limiting clutch means mounted to and rotatable with the momentum wheel means wherein the clutch means includes a plurality of friction surfaces engaging corresponding surfaces of the momentum wheel means thereby permitting controlled slippage motion therebetween including an electromagnetic coil attached to and rotatable with said spool body means and overwrapping clutch means attached to and rotatable with the clutch means wherein the overwrapping band is drawn into contact with the spool body means in response to control signals to enable the energy of the momentum wheel to be transferred to the spool body and thereafter to the crankshaft of the engine to enable rotation of the same. In one embodiment of the invention the driving means comprise a one-way bearing, shoe holder and spring loaded shoes which drive the flywheel. In an alternate embodiment of the invention the overwrapping clutch means is used as the drive means to selectively drive and disengage the flywheel.

BRIEF DESCRIPTION OF THE DRAWINGS

In the drawings:

FIG. 2 is a cross-sectional view taken through Section 2—2 of FIG. 1.

FIG. 3 is a cross-sectional view taken through Sections 3—3 of FIG. 1.

DETAILED DESCRIPTION OF THE DRAWINGS

Figure 1:
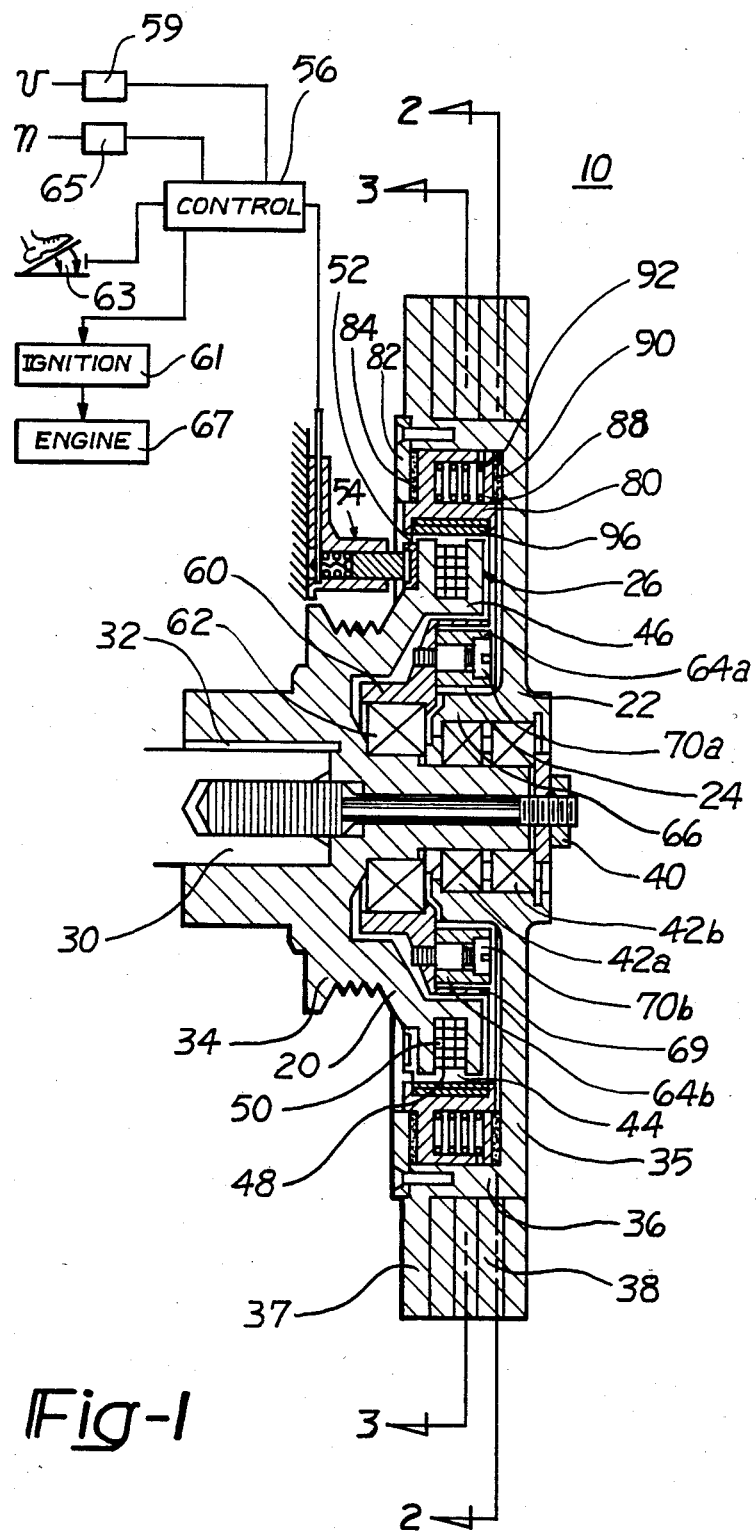
FIG. 1 is a side cross-sectional view of a restart clutch.

Reference is made to the accompanying FIGURES which illustrate an electromagnetically controlled idle restart clutch 10. The idle restart clutch 10 as shown in FIG. 1 comprises a number of major components which include a spool body 20, a momentum wheel or flywheel 22, a one-way drive means 24 and torque limiting clutch means 26. More particularly, the spool body 20 is connected to the crankshaft 30 of an engine in a conventional manner for rotation therewith. The spool body 20 is shown driven by the crankshaft 30 through the key 32.

FIG. 1 shows a pulley 34 comprising part of the spool body. The pulley 34 is not a portion of the invention but represents an element which is driven by the engine to power various accessory devices such as the water pump, air conditioner and power steering units through appropriate belts (not shown). The momentum wheel or flywheel 22 is mounted to the crankshaft 30 through a connecting bolt 40 and is supported relative to the spool body 20 by bearings such as bearings 42a and b. The flywheel 22 includes a radially extending member 35 which terminates at an axially extending wall 36 which flares into a radially extending flange 37. Additional mass may be added to the flywheel 22 by the member 38 thus increasing its inertia. As described below a retaining ring 82 is mounted to the wall 36 or flange 37. The member 35, wall 36 and retaining ring 82 cooperate to define a cup-shaped cavity 44 into which the various other elements of the idle restart clutch 10 are located. The spool body 20 contains a radially projecting member 46 which is preferably of ferromagnetic material. The projecting member 46 extends within the cavity 44 and defines an annular coil space 48 oriented perpendicular to the direction of rotation of the crankshaft 30. An electromagnetic coil 50 is disposed within the coil space 48. The coil 50 and member 46 comprise part of the torque limiting clutch 26. The spool body 20 further includes an annular slip ring 52 which is adapted to engage a slip ring brush assembly 54 in a known manner to communicate electrical signals from an electronic control unit (ECU) 56. The drive means 24, in the embodiment shown, comprises a shoe holder 60 supported relative to the spool member by a conventional one-way bearing 62. The drive means 24 further includes a plurality of spring-loaded charging shoes 64a and b. The springs 68a–d seat upon an axially extending portion 69 of the shoe holder 60 and bias the shoes 64 against an interior portion 66 of the flywheel 22. These springs are more clearly illustrated in FIG. 2. Each of the charging shoes 64a and b is secured to the shoe holder 60 through a pin 70a and b which permits a pivoting rotation of the shoes 64 relative to the shoe holder 60. Each charging shoe 64 comprises on its inner surface 72a and b a strip of friction material 74a and b, respectively. In addition each shoe 64 includes a plurality of bores 75a and b that are adapted to receive plugs 76 and their corresponding springs 68.

The torque limiting clutch 26 further comprises a disc 80 which is fitted within the cavity 44 and fixed relative to the flywheel 22 by the retaining ring 82. The disc 80 further carries a first friction or clutching surface 84 interposed the disc 80 and retaining ring 82. The clutch 26 further includes a second disc 88 having a friction material or clutching surface 90 bonded thereto. The discs 80 and 88 are biased axially by a plurality of clutching springs 92 shown in cross section in FIG. 3. In particular disc 80 is biased toward the retaining ring 82 and disc 88 is biased toward the flywheel 22. The disc 80 carries an overwrapping band 96 (see FIG. 3) that is preferably manufactured of a ferromagnetic material which upon energization of the coil 50 will cause the rotational engagement of the flywheel 22 to the spool body 20 thereby transferring the rotational energy between flywheel 22 and the engine crankshaft 30. The band 96 comprises a fixed end 100 attached to the disc 80 through a pin 102 which permits rotation of the fixed end 100 thereabout. The band 96 overlaps itself and terminates at a free end 104. A flexible strip 106 connects the free end 104 to another segment of band material 110. The springlike band 96 is normally self-biased against the disc 80. The band 96 may be fabricated as one continuous band thus eliminating the flexible strip 106. The segmented band 96 is advantageous in that it can be more easily attracted to the spool body 20 at higher rotational speeds. This is true because a segmented band by virtue of the flexible strip 106 is more flexible than a single piece band. In addition, the segmented band requires less magnetic force to attract it to the spool body 20. Conversely, for the same magnetic force, the segmented band can be pulled inwardly at a higher level of centrifugal force than a single piece band.

The following generally relates to the operation of the above-described idle restart clutch 10. During those situations when the engine 67 is running faster than the flywheel 22, torque from the engine is transmitted through the crankshaft 30 and key 32 to the spool body 20 and thereafter through the one-way bearing 62 to the shoe holder 60. The spring loading applied to the shoes 64 by their respective springs 68 maintains the shoes 64 in frictional engagement with the flywheel 22 thereby causing the flywheel 22 to rotate with the crankshaft. In response to the centrifugal force exerted on the shoes 64, the shoes, at a predetermined engine speed, will disengage from the flywheel 22 permitting the flywheel to free-wheel. During those instances when the flywheel 22 is rotating at a higher rate than that of the engine, the one-way bearing 62 permits the flywheel 22 to free-wheel on the bearings 42 and therefore not back-drive against the crankshaft 30. If the vehicle now decelerates or is brought to a complete stop, the engine will be turned off. As an example, a vehicle speed (v) sensor 59, in cooperation with the electronic control unit (ECU) 56 will determine if the vehicle is decelerating or stopped. At this point the ECU 56 would deactivate the ignition system 61 and stop the engine. When the accelerator pedal 63 is depressed, the ignition system is reactivated. Thereafter when the engine is required to restart, the coil 50 housed within the spool body 20 will be energized by the control 56 through the slip ring assembly 54 and slip ring 52. The magnetic force so generated will attract the band 96 into engagement with the spool body 20. The band 96 will thereafter overlap itself as more specifically disclosed in the commonly assigned application Overwrapping Electromagnetic Band Clutch U.S. Ser. No. 430,908 filed Sept. 30, 1982 by Casey et al, and now abandoned, which is expressly incorporated by reference thus creating a direct mechanical link between the disc 80 and spool body 20. The discs 80 and 88 are permitted to slip relative to the momentum wheel 22 because of the frictional engagement at the friction surfaces 84 and 90 such as to provide for the gradual application (i.e. torque limiting) of the energy of the flywheel 22 to the spool body. The energy of the flywheel 22 so transmitted to the crankshaft 30 quickly and quietly restarts the engine in cooperation with the reactivated ignition system 61. After the engine speed, n, as sensed by an engine speed sensor 65, has been increased to a predetermined level, perhaps 300–400 rpm, the ECU 56 will terminate the energization of the coil 50 therein permitting the overwrapping band 96 to relax thereby breaking the mechanical link between the flywheel 22 and the crankshaft 20. If the engine has been stopped for a sufficiently long though predetermined time the speed and the angular momentum of the flywheel 22 may be insufficient to restart the engine. Under this circumstance the ECU 56 would automatically reactivate the ignition system 61 and engine starter motor (not shown) to restart the engine in a relatively conventional manner.

In an alternate embodiment of the invention the one way-bearing means 62, shoe holder 60 and shoes 64 are eliminated from the invention. In this embodiment the drive means 24 also comprises the torque limiting clutch 26. In the above-described embodiment of the invention the flywheel 22 was caused to rotate with the crankshaft through the cooperation of the one-way bearing 62, shoe holder 60 and shoes 64. In this alternate embodiment of the invention the flywheel 22 is rotated with the crankshaft 30 through the cooperation of the overwrapping band 96. As an example, with the engine rotating and the flywheel stationary the ECU 56 energizes coil 60 therein bringing the overwrapping band 96 into contact with the extending portion 46 therein causing a mechanical engagement between the spool body 20 and the flywheel 22. As long as the electromagnetic coil 50 is energized the flywheel 22 will rotate with the crankshaft by virtue of the connection with the overwrapping band 96. After the flywheel 22 has been brought up to engine speed or after a predetermined time the ECU 56 de-energizes the coil 50 therein permitting the flywheel 22 to free wheel on its bearings 42. During those operating situations when the engine is thereafter turned off the flywheel 22 continues to rotate on its bearings 42 as previously described. The restarting of the engine is accomplished in the identical manner as described above by re-energizing the coil 50 to thereby re-establish the mechanical link between the flywheel 22 and spool body 20 thus permitting the transfer of the angular momentum of the flywheel into the engine's flywheel 30 to restart the engine.

Many changes and modifications in the above described embodiment of the invention can, of course, be carried out without departing from the scope thereof. Accordingly, that scope is intended to be limited only by the scope of the appended claims.

Having thus described the invention what is claimed is:

1. An idle restart clutching system for restarting an engine by transferring angular momentum to same comprising:
   control means for generating a control signal for restarting an engine;
   idle restart clutch means for storing angular momentum and in response to said control signal for transferring the stored angular momentum to a rotational member such as a crankshaft of the engine to restart same comprising:

a spool body adapted to rotationally engage the crankshaft;

momentum wheel means mounted to said spool body on bearing means for rotation thereabout, said momentum wheel means including a radially extending member, a wall and a retaining ring mounted to said wall remote from said member defining a cavity into which at least a portion of said spool body extends;

said spool body including a radially extending portion extending into said cavity, an annular slip ring adapted to engage a brush assembly for transmitting said control signal thereto, said extending portion defining a coil space for supporting an electric coil in communication with said slip ring;

momentum wheel driving means interposed said spool body and said momentum wheel means for rotating said momentum wheel means with said spool body including disengagement means for disengaging said momentum wheel means from said spool body at a determinable angular velocity; and torque limiting clutch means comprising an annular first disc fitted within said cavity in surrounding relation to said extending portion of said spool body, the disc having a friction surface adapted to engage the interior of said retaining ring, an annular second disc having a second friction surface adapted to engage said momentum wheel, a plurality of clutching springs interposed said first and said second discs for urging said first friction surface and said second friction surface towards said retaining ring and said momentum wheel means respectively, a ferromagnetic band positioned between said first disc and said extending portion and at least partially surrounding said extending portion having one end pivotally mounted to said first disc and having a free end wherein said band is brought into electromagnetic engagement with said spool body to establish a mechanical link therebetween to transfer engergy from said momentum wheel to said spool body and crankshaft.

2. The clutch as defined in claim 1 wherein said driving means includes a shoe holder rotationally supported relative to said spool body by a one-way bearing, said shoe holder supporting a plurality of spring loaded charging shoes, each charging shoe being pivotally supported on said shoe holder and including a friction surface biased by the action of the loading springs against a portion of the momentum wheel.

3. The clutch as defined in claim 2 wherein said momentum wheel means includes an interior portion or hub from which said radially extending member extends adapted to engage said friction surface of each of said shoes.

4. The clutch as defined in claim 1 wherein the friction surface of each of said shoes disengages from said interior portion at a rotational speed corresponding to the speed at which the centrifugal forces acting upon said shoes overcomes the bias force exherted on said shoes by the loading springs.

5. The clutch as defined in claim 1 wherein said driving means includes said overwrapping band wherein said overwrapping band is brought into engagement with said spool body to establish a mechanical link in response to the control signal to cause said momentum wheel means to rotate and spin at the speed defined by the rotation of said spool body means.

6. The clutch as defined in claim 5 wherein the control signal is terminated to disengage said band from said spool body to permit said momentum wheel to free-wheel relative to said spool body or engine.

7. The clutch as defined in claim 6 wherein said band is a segmented band.

8. The clutch as defined in claim 7 wherein said segmented band comprises:

the band, a flexible strip extending therefrom and joined to a ferromagnetic band segment.

* * * * *